Jan. 31, 1950     O. W. OERMAN     2,495,818
PLOW HITCH
Filed Jan. 15, 1945
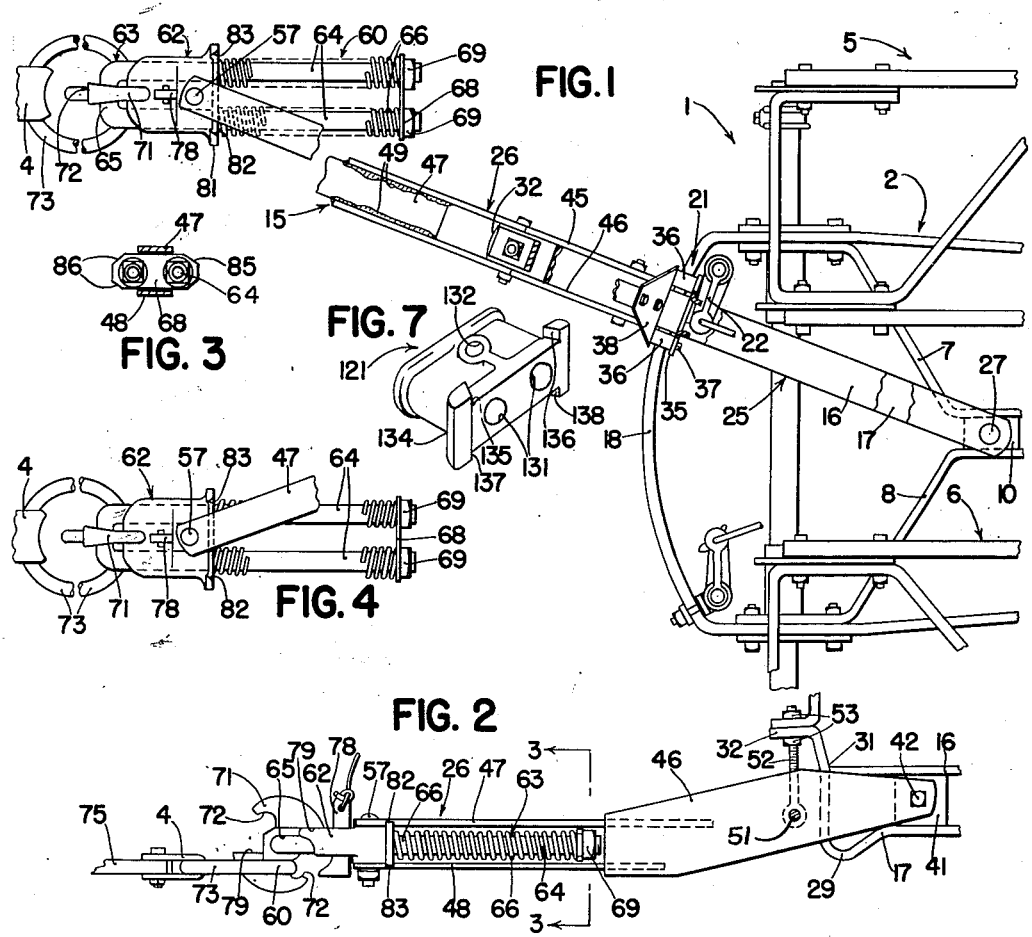
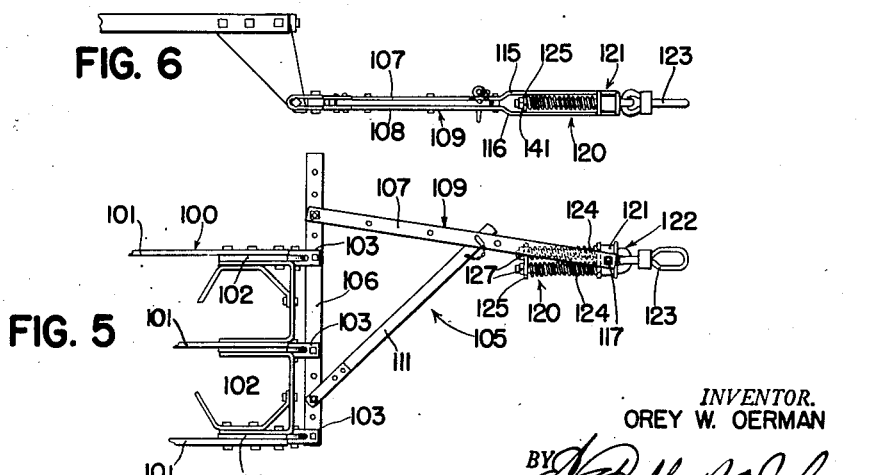
WITNESS
E. B. Bjurstrom
INVENTOR.
OREY W. OERMAN
BY
ATTORNEYS Patented Jan. 31, 1950

2,495,818

UNITED STATES PATENT OFFICE 2,495,818

PLOW HITCH

Orey W. Oerman, Moline, Ill., assignor to Deere & Company, Moline, Ill., a corporation of Illinois Application January 15, 1945, Serial No. 572,922

2 Claims. (Cl. 97—47)

1

This application is a continuation-in-part of my copending application, Serial No. 404,018, filed July 25, 1941, now U. S. Patent No. 2,385,935.

This invention relates generally to agricultural implements and more particularly to hitches for agricultural implements.

The object and general nature of this invention is the provision of a new and improved cushion hitch for agricultural implements, such as plows or the like, in which the action of the cushioning means is always substantially the same, regardless as to the direction of the draft pull. A further and important feature of this invention is the provision of a pivotal mounting for a spring cushion hitch or an overload releasable hitch, which may include longitudinally movable parts, so that the hitch may be aligned with the direction of pull regardless of the position of the implement or implement drawbar, whereby accurate and proper functioning of the hitch unit is secured by relieving the latter, especially the shiftable parts thereof, of all side thrusts which, if permitted, would tend to cause the parts to bind and would result in malfunctioning and excessive wear.

These and other objects of my invention will be apparent from the following detailed description of two preferred embodiments of my invention which are illustrated in the accompanying drawings, in which:

Figure 1 is a plan view of the hitch of a two-way plow, similar to that shown and claimed in my above-mentioned parent application, embodying a laterally swingable cushion hitch unit, which is of the releasable type, at the front end of the plow drawbar.

Figure 2 is a side view of the structure shown in Figure 1.

Figure 3 is a sectional view taken generally along the line 3—3 of Figure 2.

Figure 4 shows the position of the pivoted spring cushion unit relative to the hitch when the left hand plow bottoms are in plowing position.

Figure 5 is a fragmentary top view of a modified form of the present invention, showing the same as applied to the hitch of a one-way plow.

Figure 6 is a side view of the structure shown in Figure 5.

Figure 7 is a perspective view of the hitch plunger block used in the form of the invention shown in Figures 5 and 6.

Referring first to Figure 1, the two-way plow chosen to illustrate the principles of this invention is shown at 1 and includes a central frame 2 supported at least in part on ground wheels and on the propelling tractor, the drawbar of which is shown at 4. The implement 1 includes right and left plowing units 5 and 6 and the frame 2 has central brace members 7 and 8 bolted, as at 9, to a pivot block 10. The latter pivotally receives the rear end of a laterally swingable hitch member, indicated in its entirety by the reference numeral 15. The laterally swingable hitch member 15 preferably comprises upper and lower bars 16 and 17 passing forwardly above and below the arcuate front section 18 of the main frame 2. The hitch member 15 carries roller guide means 21 cooperating with the arcuate frame section 18 and at each terminal position of the hitch member relative thereto there is a latch 22 suitably controlled for holding the swingable hitch in one position or the other, whereby the front or draft receiving end of the hitch member is disposed in line with the plowing unit that is lowered into operating position. Suitable raising and lowering means (not shown) control both the plowing units as well as the latches 22.

The laterally swingable hitch member 15 comprises a rear section 25, which includes the upper and lower bars 16 and 17 mentioned above, and a front section 26. The rear ends of the bars 16 and 17 are apertured to receive a bolt 27 by which the hitch 15 is pivotally connected with the block 10 for lateral swinging movement. As best shown in Figure 2, the lower bar 17 is bent downwardly, as at 29, and is then extended upwardly where it is welded at 31 to the front end of the upper bar 16. The forward most portion of the lower bar 17 is bent forwardly, as at 32, to form a bracket which supports a standard which, as best shown in the parent application, carries the depth adjusting crank and the rod controlling the clutch trip lever. Rearwardly of the front ends of the upper and lower bars 16 and 17, a plate 35 is fixed to the rear bars 16 and 17 and a pair of rollers 36 are mounted for rotation on bolts 37 which connect the plate 35 with a second bracket 38 that is welded to the upper bar 16. The rollers 36 move along the curved frame bar section 18, as will be clear from Figure 1.

Plates 41 are welded to the front portions of the bars 16 and 17 and are apertured to receive a bolt 42 by which the front section 26 is pivotally connected for vertical movement relative to the rear hitch section 25. The forward or vertically swingable hitch section 26 comprises a pair of plates 45 and 46 (Figure 1) disposed at opposite sides of the front end portion 29 of the lower hitch bar 17, the forward end of the latter thus serving as a guide for the front hitch section 26. The plates 45 and 46 are connected together in laterally spaced apart relation by a pair of upper and lower straps 47 and 48 which are welded, as at 49, to the front ends of the plates 45 and 46. A bolt 51 extends through openings in the plates 45 and 46 under the bracket 32 and receives the eye of a vertically disposed adjusting bolt 52. The upper threaded end of the latter extends through openings in the bracket 32 and the part supported thereby, and a pair of lock nuts 53 serve to fix the bolt, and the vertically swingable hitch section 26, in different positions of adjustment. Loosening one of the nuts 53 and tightening the other, raises or lowers the front end of the hitch section 26 to correspond to the depth adjustment of the plows.

The forward ends of the strap members 47 and 48 are apertured to receive a pivot bolt 57 by which a spring cushion release hitch unit 60 is connected thereto. The present invention is not particularly concerned with the details per se of the hitch unit 60, the same being substantially like that shown in the United States Patent No. 2,271,748, issued February 3, 1942, to Carl G. Strandlund, to which reference may be had if necessary. Briefly, the spring cushion release unit 60 includes a frame made up of the upper and lower straps 47 and 48 and an abutment member 62 which is apertured longitudinally to receive a slidable U-shape draft member 63. The latter includes end portions 64 and a bight section 65, and cushion springs 66 are disposed about the end portions 64 of the draft bolt 63 and are compressed between the rear end of the abutment member 62 and an abutment plate 68 which is held in position on the draft bolt 63 by a pair of adjusting members 69. A rotatable coupling member 71 is mounted on the bight portion 65 of the draft bolt 63, the coupling member 71 preferably being in the form of a generally circular member having a plurality of open ended draft jaws or hook portions 72, each of which is adapted to receive a clevis member 73 that is connected to the drawbar 75 of the propelling tractor to which the implement is hitched. A vertically slidable link 76 is carried by the abutment member 62 for normally holding the clevis 73 in position engaged in one or the other of the draft hook portions 72. The rotatable draft coupling member 71 is also provided with an abutment shoulder 79, one for each draft hook 72, and the function of the shoulder 79 is to prevent the coupling member 71 from rotating unless the draft pull increases to an abnormal degree, compressing the springs 66 to a point where the shoulder 79 becomes disengaged from the abutment member 62, thus permitting the coupling member to rotate and free the clevis member 73 from connection therewith. Also, the springs 66 cushion the application of draft power by yielding, during which action the shoulder 79 slides in and out relative to the abutment member 62 but not becoming disengaged therefrom until the load reaches an abnormal degree. The point of release may be adjusted by tightening or loosening the adjusting nuts 69.

Figure 1 shows one operating position of the hitch 15, in which the latter is disposed at an angle to the general longitudinal axis of the machine and at an angle to the line of draft which passes through the front end of the hitch 15 generally longitudinally rearwardly to the center of the distance of the plow bottom or plow bottoms that are lowered into plowing position. When the other plowing unit is to be in operating position, the hitch 15 is swung to the other side. Therefore, in view of the fact that the hitch member 15 occupies a position at an angle to the line of pull, first to one side of the line of pull and then to the other side, the spring cushion unit 60 is arranged for pivoting action on the pivot bolt 57 so that there can be no binding or cramping of the relatively slidable parts of the spring cushion release hitch unit 60. To this end, the rear portion of the abutment member is provided with a flanged portion 81, the upper and lower parts of which are interrupted to permit the front ends of the bars 47 and 48 to pass through, thus forming laterally spaced stop sections 82 and 83. As best shown in Figure 1, these stop portions provide for a considerable amount of swinging of the cushion unit 60 about the axis of the bolt 57 but such swinging movement is limited by the stops 82 so that excessive swinging is not permitted and, when necessary, the outfit may be backed merely by backing the tractor. Also, the rear abutment plate 68 is provided with tapered ends (Figure 3), as indicated at 85 and 86, which cooperate with the upper and lower straps 47 and 48 in preventing the rear end of the cushion unit from becoming caught on the edges of the bars 47 and 48, thus providing for free swinging movement, within the limits defined by the stops 82 and 83, of the cushion unit 60.

This construction has the advantage of the sliding parts of the cushion unit 60 or always disposed in the line of pull, regardless of the angular disposition of the hitch 15. If the line of pull was disposed at an angle to the slidable parts of the cushion 60, binding of the slidable parts that move one relative to the other would interfere with the proper response of the unit to abnormal loads and would cause excessive wear, particularly where the draft bolt 63 passes through the abutment member 62. Where, according to the principles of the present invention, the cushion unit 60 is pivotally mounted so that it can always swing directly into the line of pull, the advantages and functions of the unit 60 are retained, irrespective of the angular position of the hitch 15.

The position of the laterally swingable hitch 15, pivoted at 27 to the frame 2, is automatically controlled by mechanism that is set forth in detail in the above-mentioned parent application and need not be repeated here, the swingable hitch member being locked by one or the other of the latches 22, depending on which set of plows it is desired to have in operation. Figure 1 shows the position of the cushion unit relative to the hitch 15 when the right hand plow bottom or bottoms are in operation and Figure 4 shows the position of the cushion unit relative to the hitch 15 when the left hand plow bottom or bottoms are operated.

The principles of the present invention are not necessarily limited to a spring cushion release hitch mounted on a two way plow. For example, it is sometimes necessary to adjust the hitch of a towed one way plow to different angular positions with respect to the line of pull so as to accommodate different widths of tractors or for other reasons, and in operating conditions of this kind it is very desirable to have the spring cushion unit mounted to swing laterally and relatively to the plow hitch so that the relatively slidable parts of the cushion unit do not bind or jam but are arranged to move directly in the line of pull so that there can occur no excessive wear or erratic action due to side thrusts or extensive loading. Referring now to Figures 5-7, the plow indicated by the reference numeral 100 is a three bottom heavy duty plow including three beams 101 connected at the front ends by suitable hitch plates 102 and clevises 103 to a hitch structure indicated in its entirety by the reference numeral 105. The latter includes a transverse apertured hitch cross bar 106 to which the rear ends of a pair of straps 107 and 108 making up a hitch drawpar 109 are pivotally connected. The drawbar 109 is adapted to be connected in any one of a number of different positions laterally along the hitch cross bar 106. A hitch brace member 111 is connected between one end portion of the cross bar 106 and the drawbar 109 for holding the front end of the latter in different lateral positions as required by the particular kind and/or tread of the tractor to which the plow is hitched or by other operating positions.

As best shown in Figure 6, the upper and lower drawbar strap members 107 and 108 are offset so as to be spaced apart vertically, as indicated at 115 and 116, and the forward ends of the members 107 and 108 are apertured to receive a pivot bolt 117. A cushion spring unit 120 is connected to the front ends of the drawbar members 107 and 108. The cushion unit 120 includes a hitch plunger block 121, best shown in Figure 7, a U-shaped plunger in the form of a draft bolt 122, a draft link 123 connected with the forward or bight portion of the plunger 122, a pair of compression springs 124 mounted on the legs of the U-shaped draft bolt or plunger 122, an abutment plate 125 apertured to receive the rear threaded ends of the plunger 122 and adjusting nuts 127 mounted on the threaded ends of the plunger 122. As best shown in Figure 7, the plunger block 121 is provided with a pair of longitudinally extending apertures 131 to receive the two lug portions of the plunger 120 and with a vertical opening 132 to receive the pivot bolt 117. The rear end of the plunger block 121 is provided with a flanged portion 134 which, like the plunger block described above, is formed with an upper pair of abutment stops 135 and 136 and a lower pair of abutment stops 137 and 138. The wall portions of these stops are spaced apart laterally to receive therebetween the upper and lower drawbar strap member 107 and 108, and the spacing between the stops is such that the cushion spring unit 120 is permitted to swing a limited amount, but such swinging is limited so that by driving the tractor the outfit can be backed without the spring unit collapsing. The rear abutment plate 125 is substantially the same as the rear abutment plate 68 described above, that is, is provided with tapered ends 141 to facilitate the lateral swinging of the cushion spring unit in between the forward end portions 115 and 116 of the drawbar strap members 107 and 108.

The spring cushion unit 120 is pivotally connected for lateral swinging movement to the front end of the associated hitch member in substantially the same way as the spring cushion release unit 60 is connected with the front end of the hitch member shown in Figure 1. While the member 120 is not a releasable member, it includes relatively slidable parts and in order to prevent binding of these parts during operation and therefore interfering with the proper cushioning action, the unit 120 is mounted to swing about a vertical axis relative to the drawbar so that the parts of the cushion hitch unit may line up with the draft pull so that there is no side draft pull and no tendency for the parts to bind or wear excessively due to lateral thrusts, offset loads or the like.

While I have shown and described above the preferred structures in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement having a member through which draft may be transmitted to the implement, said member comprising a pair of generally vertically spaced longitudinally extending parts, a spring cushion hitch adapted to be connected to propelling means to receive draft therefrom and comprising a plunger block, means pivoting said plunger block to the forward ends of said parts and disposed between the latter for lateral swinging movement relative thereto, a longitudinally shiftable plunger mounted in said block and adapted to be connected at its forward end with said propelling means forward of said block and swingable with the latter between said vertically spaced parts, a compression spring disposed about said plunger between the rear end of the latter and the rear portion of said block, said plunger and spring swinging laterally with said block between said parts about said pivot axis whenever the draft member is disposed at a line to the line of draft.

2. An agricultural implement having a drawbar member through which draft may be transmitted to the implement, said drawbar member including a pair of vertically spaced bars, a pivot block pivotally mounted between the forward end of said bars for movement about a generally vertical axis, said pivot member having a pair of longitudinally extending openings therethrough, a generally U-shaped draft bolt extending through the openings in said pivot member, a pair of compression springs mounted on the sides of said U-shaped draft bolt on the rear side of said pivot block, and an apertured abutment plate mounted on the rear ends of the sides of said U-shaped draft bolt and adapted to swing with the latter and said pivot block, the ends of said abutment plate being tapered to facilitate movement of the rear end of said draft bolt and associated parts through the space between said upper and lower drawbar members.

OREY W. OERMAN.

REFERENCES CITED

The following references are of record in the file of this patent:

UNITED STATES PATENTS

| Number | Name | Date |
|---|---|---|
| 1,126,427 | Eddy | Jan. 26, 1915 |
| 1,176,580 | McKay | Mar. 21, 1916 |
| 1,262,456 | Colwell | Apr. 9, 1918 |
| 1,291,177 | Saunderson | Jan. 14, 1919 |
| 1,344,899 | Junek | June 29, 1920 |
| 1,372,413 | Flugekvam | Mar. 22, 1921 |
| 1,521,625 | Hoke | Jan. 6, 1925 |
| 1,678,114 | Gustafson | July 24, 1928 |
| 2,012,458 | Strandlund | Aug. 27, 1935 |
| 2,121,416 | White | June 21, 1938 |
| 2,188,413 | Markel | Jan. 30, 1940 |
| 2,271,748 | Strandlund | Feb. 3, 1942 |
| 2,327,927 | Orelind | Aug. 24, 1943 |
| 2,383,698 | Young | Aug. 28, 1945 |
| 2,385,935 | Oerman | Oct. 2, 1945 |

FOREIGN PATENTS

| Number | Country | Date |
|---|---|---|
| 188,549 | Great Britain | Nov. 16, 1922 |